UNITED STATES PATENT OFFICE.

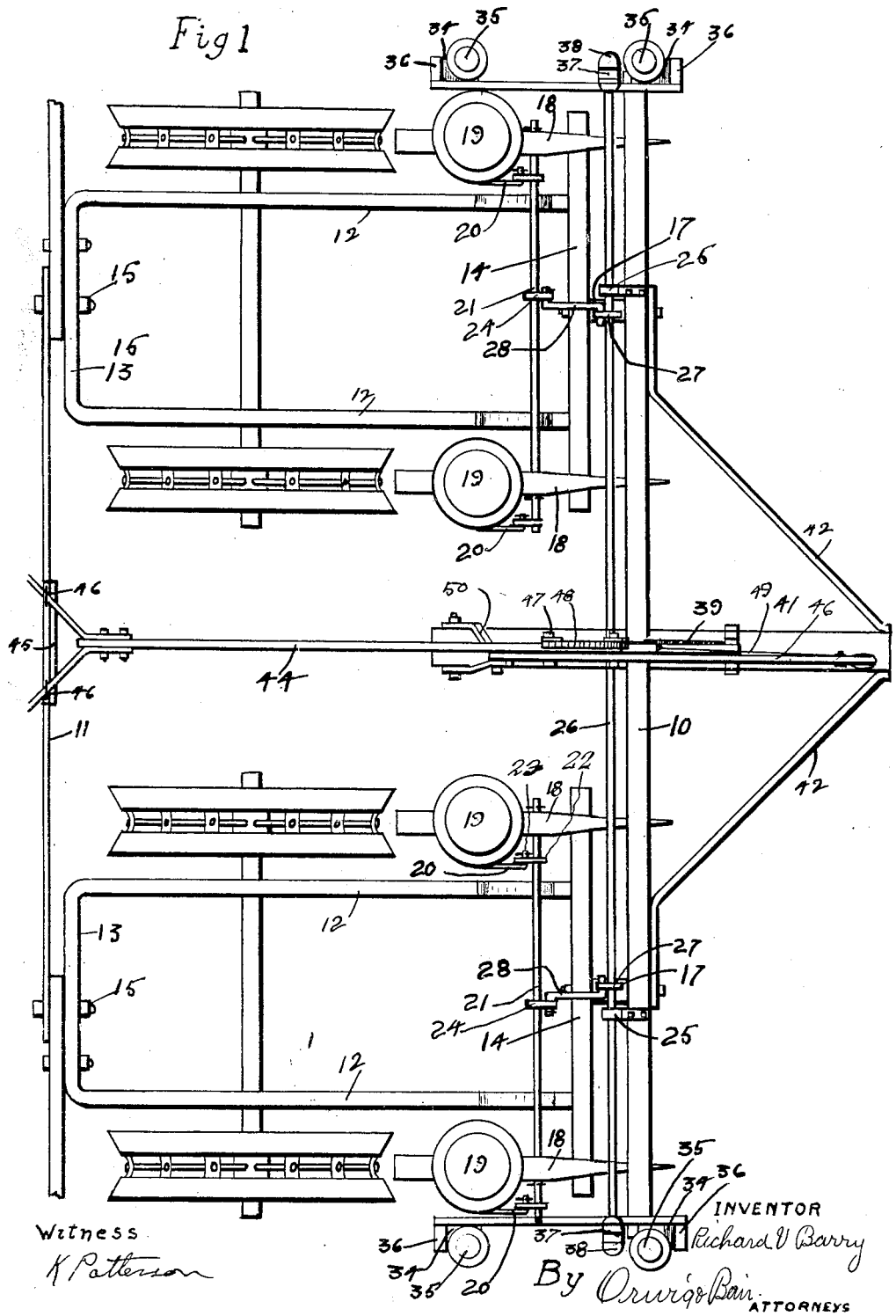

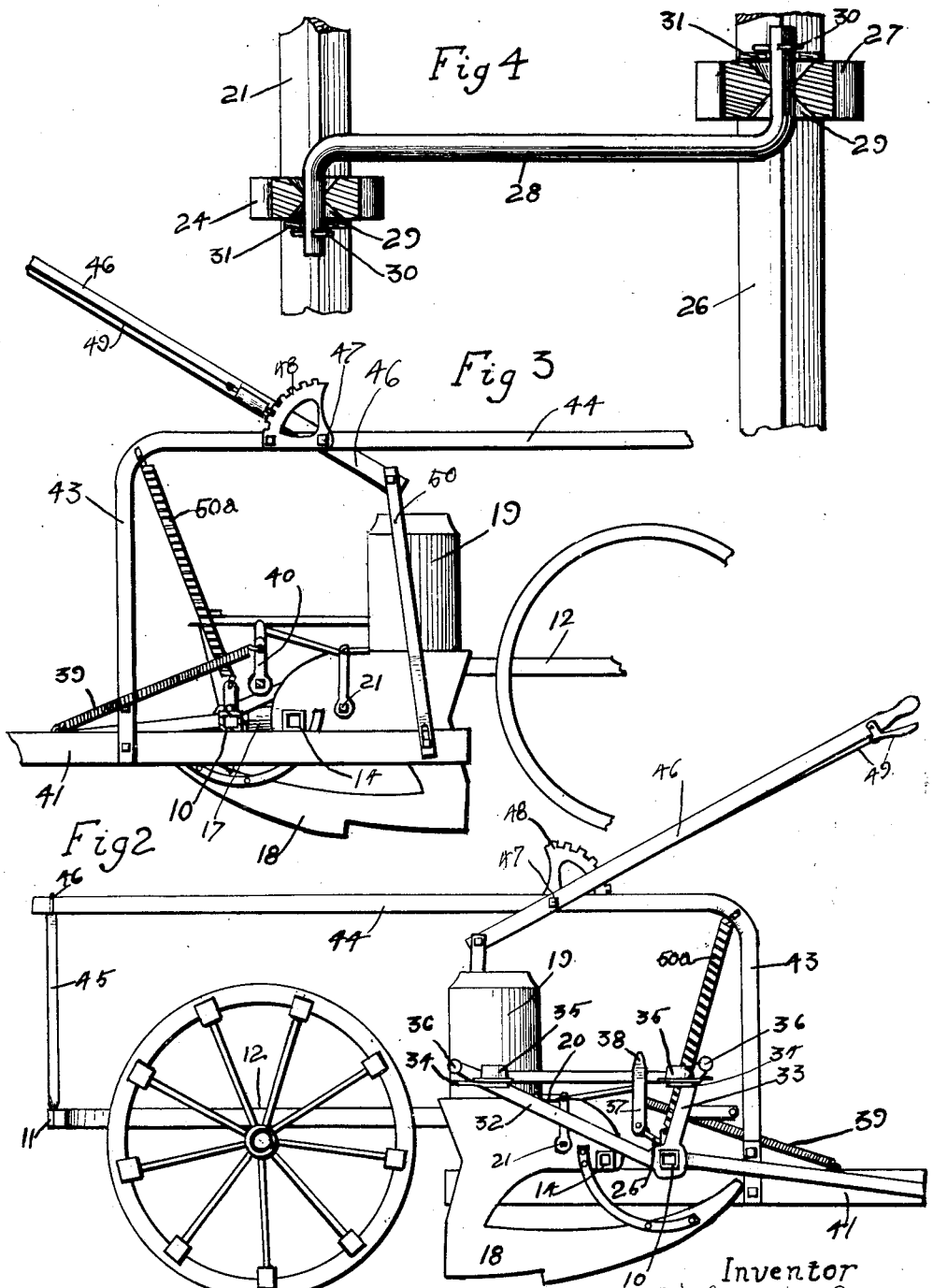

RICHARD V. BARRY, OF OTTUMWA, IOWA.

FOUR-ROW CORN-PLANTER.

1,370,777.   Specification of Letters Patent.   Patented Mar. 8, 1921.

Application filed February 10, 1920. Serial No. 357,673.

*To all whom it may concern:*

Be it known that I, RICHARD V. BARRY, a citizen of the United States, and a resident of Ottumwa, in the county of Wapello and State of Iowa, have invented a certain new and useful Four-Row Corn-Planter, of which the following is a specification.

The object of my invention is to provide a four row corn planter of simple, durable and inexpensive construction.

A further object of my invention is to provide improved mechanism, whereby a corn planter for planting four rows simultaneously may be operated.

A further object of my invention is to provide means actuated by the knots in the wires, which determine the intervals at which the hills of corn are spaced, which is so arranged that movement of the various planting devices relative to each other, due to the contour of the ground may be allowed, but at the same time, the planting mechanism of each planting device will be simultaneously operated when the entire machine passes each knot in the wire.

With these and other objects in view, my invention consists in the construction, arrangement and combination of the various parts of the device, whereby the objects contemplated are attained, as hereinafter more fully set forth, pointed out in the claims and illustrated in the accompanying drawings, in which:

Figure 1 shows a top or plan view of my improved corn planter.

Fig. 2 shows a side elevation thereof.

Fig. 3 shows a vertical, sectional view taken on the line 3—3 of Fig. 1; and

Fig. 4 shows an enlarged, detail view illustrating certain of the operating connections.

Referring to the accompanying drawings, I have used the reference numeral 10 to indicate generally a comparatively long draft bar, which extends across the entire front of my improved machine, and 11 to indicate the transverse bracing member at the rear of the machine.

Extended between the members 10 and 11 at either side of the central portion thereof are sub-frame members, comprising longitudinal bars 12 and transverse bars 13 and 14. The bars 13 and 14 are each pivotally connected with the bars 10 and 11 on alined horizontal fore-and-aft axes.

In this instance, I have shown these pivots, as comprising bolts 15 and 16, which are pivotally received in the frame members 13 and 14 and the members 11 and 10, whereby said members 13 and 14 and the sub-frame of which they are a part are permitted rotary motion on a longitudinal axis relative to the frame members 10 and 11.

The members 14 may be spaced from the member 10 by means of a hollow spacing sleeve 17, if desired.

The members 14, extend laterally from the members 12 and a planting mechanism is mounted on each such extended member, and comprises a shoe 18, a seed holding receptacle 19 and an operating rod or pitman 20.

It will be understood that the pitman 20 must be reciprocated in order to operate the planting mechanism to cause the latter to drop a seed down through the shoe and into the ground, where the shoe will cover the seed. Reciprocation of the pitman 20 of varying degrees causes a varying number of seeds to be dropped, the number of seeds being proportionally increased, as the distance that the pitman goes is increased.

Journaled in the shoes 18 of each sub-frame is a transverse rock shaft 21. It will be understood that the rock shaft 21 may also, if desired, be journaled in the frame members 12 or in any other suitable way.

Extended upwardly from the rock shafts 21 adjacent to each of the planting mechanisms is an arm 22, which has an opening in its upper end designed to pivotally receive the bent over end of one of the pitmen 20. The ends of the pitman 20 may be held in the arms 22 by any suitable means, as by a cotter-pin 23.

From the construction of the parts just described, it will be seen that rocking of the shaft 21 will impart reciprocation to the pitman 20, thereby actuating the seed dropping device in the planting mechanism.

Rocking the shafts 21 through greater or lesser distances imparts greater or less reciprocation to the pitman 20, and therefore regulates the number of seeds dropped by the planting mechanism.

Each rock shaft 21 has an arm 24 projecting upwardly therefrom, intermediate of its ends, which has an opening therein adjacent to the upper end thereof.

Journaled in brackets 25, which extend rearwardly from the frame member 10 is a main rock shaft 26. Extending upwardly from the rock shaft 26 in position adjacent to the arms 24 are similar upwardly extending arms 27. The arms 27 are operatively connected with the arms 24 by links 28.

Both the arms 24 and 27 have openings 29 therein adjacent to the upper ends thereof, which are contracted at their central portions, and flared uniformly outwardly from the contracted portions to the outer edges of said openings. The links 28 have angular bends at either end, which extend through the openings 29 and are perforated to receive cotter-pins 30, whereby the said ends may be held from movement out of the arms 24 and 27.

Washers 31 may be provided, if desired, adjacent to the cotter-pins 30. The contracted portions of the openings 29 are of approximately the same diameter as are the links 28, whereby the ends of said links may be closely received in said contracted portions, but said ends may be permitted to have a limited universal movement in said openings, due to the flared end portions thereof.

The operation of the parts just described will be more clear, when it is recalled that the sub-frames are pivotally mounted relative to the main frame, comprising the members 10 and 11, to permit the sub-frame to swing upon a horizontal, longitudinal axis.

If then the arms 24 are to be operated from the arms 27, then the connecting means between said arms must permit the necessary movement of the arms relative to each other, due to the pivotal mounting of the sub-frames.

It is, however, essential, as will hereinafter be brought out, that there should be no lost motion between the rock shafts 26 and 21.

As will be made clear by referring to Fig. 4, it will be seen that swinging of the arms 27 and 24 on their respective rock shafts will exert corresponding pressure upon the arms 24 and 27, but that this pressure will be transmitted with comparatively no lost motion, due to the close engagement of the ends of the links 28 with the contracted portions of the openings 29.

The flared ends of these openings will, however, permit the necessary movement of the links 28, due to the swinging of the sub-frames upon their pivots.

At either end of the frame member 10, a casing is mounted comprising an upwardly and rearwardly extending arm 32 and an upwardly and forwardly extending arm 33. Mounted on these arms 32 and 33 are outwardly extending brackets 34, which carry rollers 35. The arms 32 and 33 also have rollers 36 mounted thereon adjacent to the ends thereof.

It will be understood that the rollers 35 and 36, the arms 32 and 33 and the brackets 34 together form guides for the wires, which extend across the field when planting is being done, and which have knots therein at pre-determined intervals designed to coact with some part of the planter to cause the said part to operate the planting mechanism at pre-determined intervals.

In this case, I have shown a lever or arm 37 secured to the end of the rock shaft 26, which has forked ends 38, designed to receive between them the wire which is guided through the parts mentioned.

Referring to Fig. 2, it will be seen that if a wire is strung through the guide devices described and through between the forked ends of the arm 37, then a knot in the wire which engages the said forked ends will cause the upper end of the arm 37 to move rearwardly, as the corn planter progresses forwardly.

After the arm 37 swings a pre-determined distance, then the knot will slide out from between the forked ends 38 and permit the arm 37 to return to an upright position. The return of the arm 38 to its upright position is insured by a spring 39. The spring 39 has one end connected to the planter tongue and the other end connected to an upwardly extending arm 40, which is fixed to the rock shaft, as illustrated in Fig. 3.

From the construction of the parts just described, it will be seen that operation of the rock shaft 26 will impart through the links 28 a simultaneous rocking of the rock shafts 21. Rocking of the shafts 21 simultaneously actuates the pitman 20 to thereby cause the planting device to drop a predetermined number of seeds.

The forward movement of the planter, as has heretofore been mentioned when the wire is strung through the guides at either end of the main frame will cause the necessary actuation of the rock shaft 26, when the arm 37 contacts with the knots in the wire at pre-determined intervals.

My main frame is operatively connected with the tongue, whereby it is pulled by the following described mechanism:

A tongue 41 or other device of rigid construction is bolted to the frame member 10. Auxiliary braces 42 may be extended from the tongue 41 to the frame member 10, if desired. A yoke 42 or U-shaped connecting frame member comprises an upwardly extending arm 43, which has its lower end pivotally connected with the tongue 41 at a place spaced forwardly from the frame member 10.

A laterally and rearwardly extending arm 44 extends to position above the frame member 11, where it is fixed to a supporting yoke 45 by means of U bolts 46.

In the form of the device here illustrated, the rearwardly extending member 44 is divided just forwardly from the yoke 45, and its arms flared away from each other, in order to form a support for a seat, which is not, however, here shown. The lower end of the yoke 45 is fixed to the frame member 11 in any suitable manner.

Intermediate of the ends of the bar or arm 44, a controlling lever 46 is pivoted at 47, and a notched sector 48 is fixed to the bar 44 adjacent thereto. A dog device for locking the lever 46 from movement of any suitable construction is mounted on the lever, and adapted to coact with the sector 48. At the rear end of the lever 46, a link 50 is pivotally connected, and the opposite end of the link 50 is pivotally and slidably connected to the rear end of the tongue 41. The spring 50ª has one end connected to the main frame yoke member adjacent to the upper end of the vertical portion 43, and its opposite end fixed to the main frame bar 10.

From the construction of the parts just described, it will be seen that operation of the lever 46 will through the action of the link 50 impart a pivotal motion to the tongue 41 relative to the bar 43.

It will be noted that the height of the forward end of the tongue 41 will be controlled by its attachment to a tractor or to the harness of horses, and that the height of the rear end of the bar 44 will be substantially the same at all times, due to the fact that it is supported by the yoke 45, the frame member 11, the sub-frames and their wheels.

Pivotal movement of the tongue 41 relative to the bars 43 and 44 therefore permits the pivotal connection between the tongue and said bars to lower or raise, thereby allowing the main frame member 10 to correspondingly raise and lower, due to the fact that it is fastened to the tongue 41, adjacent to said pivotal connection.

As the shoes 18 are supported indirectly through the main frame member 10, it will be seen that raising and lowering this frame member will cause a corresponding raising and lowering of the shoes 18.

It will be noted that due to the sliding, pivotal connection between the link 50 and the rear end of the tongue 41, that the shoes 18 will be yieldingly pressed into the ground with a pressure equal to the difference between the weight on the shoes on the frame member 10 and the tension on the spring 50ª. This structure therefore allows the necessary reciprocation of the shoes, due to uneven ground surfaces and at the same time minimizes the effort required to swing the lever 46.

In this connection, it will be noted that as the height of the forward end of the tongue 41 is controlled by its attachment to the means whereby the planter is moved over the ground, and as the height of the rear end of the main frame yoke, comprising the bars 43 and 44 and the yoke 45, is regulated by the contour of the ground upon which the wheels of the machine are resting, that the engagement of the shoes with the ground will be determined by the average contour of all the ground adjacent to the planter, thereby making the depth at which the seeds are planted by all the shoes on the planter, as nearly uniform as possible.

From the description of the foregoing parts, it will be seen that I have provided means whereby the depth at which the seeds are planted from all four shoes is substantially uniform, the advantages of which will of course be obvious.

In this connection, it may be mentioned that in other machines with which I am familiar, where there are more than two planting devices, then the depth at which the seeds are planted has been variable, which produces disadvantages resulting from the use of seed machines.

Furthermore, my controlling mechanism for planting the seeds is so arranged that all four of the planting devices will be operated substantially simultaneously, so that there will be a minimum variation in the distances between the hills of the various rows.

In this connection, it may be mentioned that I have conducted a large number of experiments, while attempting to secure a planting control mechanism for a planter, having four planting devices, and that with the devices, which I have heretofore tried, the time at which the different planting devices of the planter operated was not uniform, due to lost motion in the controlling devices.

By referring to Fig. 4, it will be seen that the construction there shown admits of a minimum amount of lost motion when the impulse from the knots in the wire is transmitted from the various planting mechanisms in the planter.

On the other hand, this connection admits of the necessary variation in position of the different planting devices, due to the uneven contour of the ground.

Lost motion in the operative devices for the planting mechanisms, where a plurality of seed planting mechanisms are used not only results in an irregular distance between the hills of the various rows, but also, due to the construction of the planting mechanisms, oftentimes results in inequalities in the number of seeds dropped in the hills.

In this connection, it may be mentioned that movement of the pitman 20 through different distances causes different numbers of seeds to be dropped at each planting operation, so that if the motion transmitted to the pitman is not uniform then the number of seeds dropped from the container will not be uniform.

I claim as my invention:

1. A four row planter comprising a main frame, said main frame including a bar extended transversely across the front portion of the planting device, a trip device at either end of said bar, adapted to be actuated by the knots in planter wires, a rock shaft journaled to said bar and operatively connected with said trip devices, two sub-frames, each including supporting wheels, two runners and two planters associated with the runners, each of said sub-frames being pivoted along a longitudinally central line to the main frame, so that each sub-frame may oscillate relative to the main frame in such manner that both runners may rest by gravity with equal pressure upon the ground, a rock shaft mounted in the forward portion of each of said sub-frames, and operatively connected with the planting mechanism, and means for connecting each of said rock shafts on the sub-frame with the rock shaft on the main frame, whereby when the rock shaft on the main frame is actuated the rock shafts on both sub-frames will be operated simultaneously with each other, for the purposes stated.

2. A four row planter comprising a main frame, a bar extended across the front of the main frame, a trip device at each end of said cross bar, supported by the cross bar and designed to coact with a knotted wire, a rock shaft supported on said main frame and designed to be actuated by either of said trip devices, two sub-frames, each comprising supporting wheels, two runners and two planting mechanisms, said sub-frames being pivoted along their longitudinal centers at the front and the rear to said main frame, a rock shaft carried by each of said sub-frames, and arranged, when operated, to simultaneously operate both of the planters on said sub-frame, and means for connecting the rock shaft of the main frame with both of the rock shafts on the sub-frames, for simultaneously operating the rock shafts on the sub-frames, for the purposes stated.

Des Moines, Iowa, December 26, 1919.

RICHARD V. BARRY.